United States Patent [19]
Yamaguchi et al.

[11] Patent Number: 5,823,281
[45] Date of Patent: Oct. 20, 1998

[54] HYBRID VEHICLE

[75] Inventors: Kozo Yamaguchi; Hiroyuki Kojima, both of Aichi-ken, Japan

[73] Assignees: Kabushikikaisha Equos Reseach; Aisin AW Co., Ltd., both of Japan

[21] Appl. No.: 653,614

[22] Filed: May 24, 1996

[30] Foreign Application Priority Data

May 25, 1995 [JP] Japan ................................. 7-150882
Dec. 5, 1995 [JP] Japan ................................. 7-344542

[51] Int. Cl.⁶ ....................................................... B60K 1/02
[52] U.S. Cl. ........................................ 180/65.2; 180/65.4
[58] Field of Search ................................ 180/65.1, 65.2, 180/65.3, 65.4, 165; 318/140, 141, 149, 151, 152, 153, 157; 364/424.01

[56] References Cited

U.S. PATENT DOCUMENTS

| | | | |
|---|---|---|---|
| 4,470,476 | 9/1984 | Hunt | 180/65.2 |
| 4,588,040 | 5/1986 | Albright, Jr. et al. | 180/65.4 |
| 4,953,646 | 9/1990 | Kim | 180/65.4 |
| 5,323,868 | 6/1994 | Kawashima | 180/65.4 |
| 5,489,001 | 2/1996 | Yang | 180/65.4 |

*Primary Examiner*—Richard M. Camby
*Attorney, Agent, or Firm*—Lorusso & Loud

[57] ABSTRACT

A hybrid vehicle has an internal-combustion engine; an electric motor; a generator from which rotational speed is controlled; an output shaft connected for driving drive wheels; a differential gear unit composed of at least three elements in which a first element is connected to the engine, a second element is connected to the generator, and a third element is connected to the output shaft and the electric motor; electric storage means for supplying electric power to the electric motor and for storing electric power generated in the electric motor and the generator, the electric storage means being electrically connected to both the electric motor and the generator; required minimal load judgment means for judging the required minimal load for driving the vehicle; and generator control means for controlling a rotational speed of the generator and a change rate of the rotational speed, in which the generator control means controls in response to the required minimal load judged by the required minimal load judgment means. The hybrid vehicle allows for controlling shock produced by, for example, engaging the brake.

18 Claims, 13 Drawing Sheets

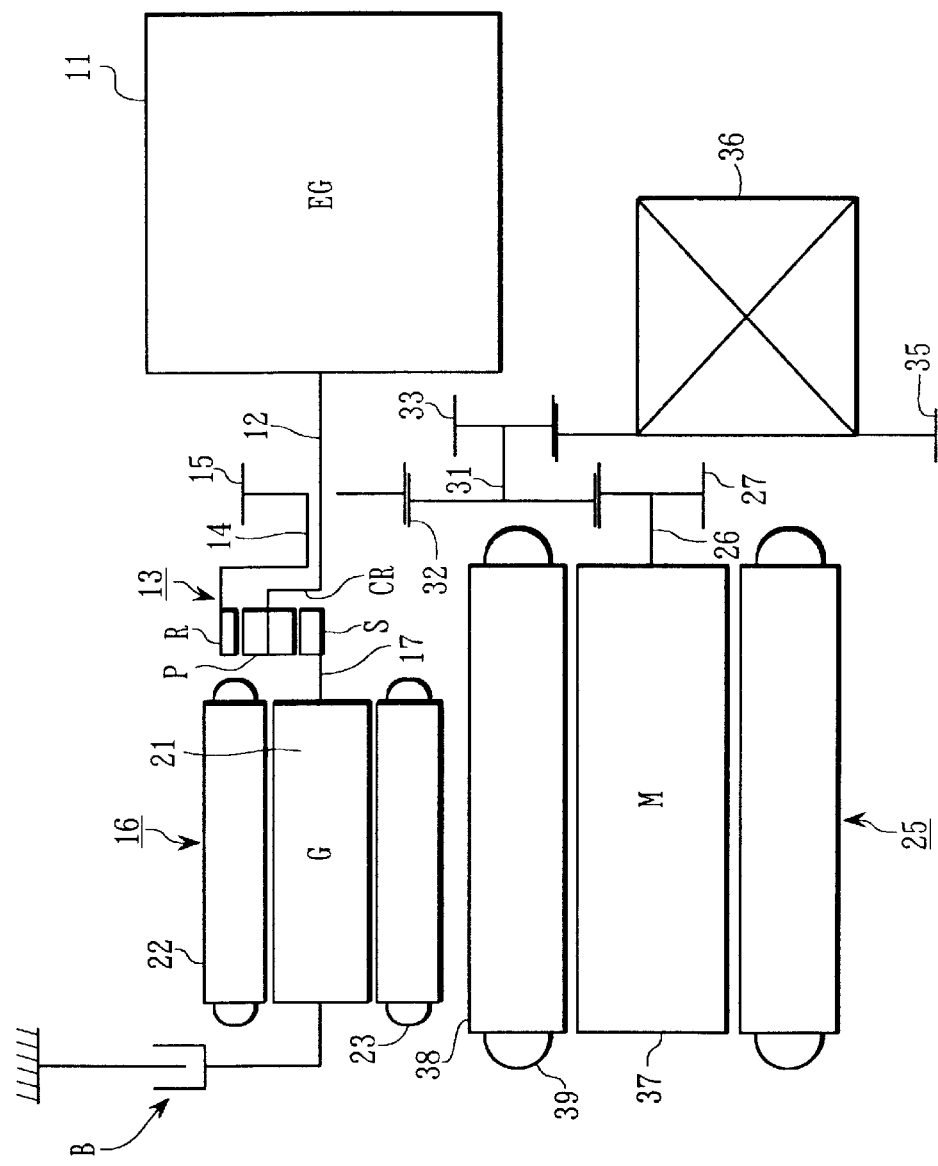

HYBRID VEHICLE

BACKGROUND OF THE INVENTION

1. Field of the Invention

This invention relates to a hybrid vehicle driven by an engine and a motor as driving source.

2. Description of the Related Art

Hybrid vehicles, which use both a conventional engine capable of being easily refueled with fuel and a motor using clean electric energy, have been proposed. The hybrid vehicle has three types; a series type in which an engine is used for generating electricity to charge a battery, a parallel type in which the engine is connected to the drive train of the vehicle, and a combined type (a seri-para type) which combines features of the series and parallel types.

In particular, as the seri-para type, a hybrid vehicle has been proposed (U.S. Pat. No. 3,566,717), in which the generator is connected to the engine, and a part of the output from the engine is used for generating electricity while the remaining output from the engine is directly output to a drive shaft. In the hybrid vehicle, the driving force is produced by the motor iy using electric power (A) from the battery, and further, the battery is charged by using electric power (B) from the generator which is caused by a part of the engine driving force.

According to the aforementioned hybrid vehicle, the engine can be used in a highly efficient range, and all energy produced in the engine is not used for generating electricity thus differing from the hybrid vehicle of the series type, resulting in improved fuel consumption. The engine can be driven in a steady-state, resulting in reduction of exhausted gases. Further, by controlling the rotational speed of the generator, a running mode can be changed to an engine/motor driving mode, a motor driving mode and so on, furthermore, regenerative electric power can be charged to the battery and the engine can be started.

However, in the aforementioned hybrid vehicle, the engine, the generator and the driving motor are connected through the differential gear unit, therefore, respective rotational speeds or torques are mutually related, so that, for example, in order to operate an engine-brake, a brake provided to the generator is operated and a rotor of the generator is locked when required.

Here, if the change of the rotational speed is greater, for example the rotation of the generator is suddenly stopped by the brake, the fluctuation of the engine output should be greater, with the result that there is the fear of producing incongruity on the driver with the change of the engine speed and frictional materials is significantly exhausted by heating.

In order to absorb the aforementioned shock, when a shock absorber, for example, an accumulator, is provided, adjustment for an orifice, an accumulator-spring and so on is required for every vehicle, resulting in the disadvantage of expense in time and effort for production or maintenance. Further, effects by the time-change of the coefficient of friction of the frictional materials, the driving condition, temperature and so on cause difficulty to stably maintain the effective shock absorbence of the accumulator, thereby an expected effect is not obtained in many cases.

Furthermore, the attachment of the aforementioned shock absorber causes the structure to be complicated, resulting in an undesirable structure for the electric vehicle having smaller space for loading.

In the aforementioned hybrid vehicle, regardless of the running of the vehicle, the amount of generating electricity is increased by increasing the rotational speed of the generator when the battery charged capacity is decreased. In consequence, the engine speed is suddenly increased and the sound of the engine is changed, resulting in a difference in feeling of the speed compared with the driver's feeling.

It is an object of the present invention to provide a hybrid vehicle which controls the steep change of the engine speed by controlling the change of the rotational speed of the generator.

It is another object of the present invention to provide a hybrid vehicle which controls shock, caused when an engagement means is engaged, by previously controlling the generator rotational speed.

SUMMARY OF THE INVENTION

In order to attain the aforementioned objects, the present invention provides a hybrid vehicle which is characterized by including an internal-combustion engine; an electric motor; a generator from which rotational speed is controlled; an output shaft connected for driving drive wheels; a differential gear unit composed of at least three elements in which a first element is connected to the engine, a second element is connected to the generator, and a third element is connected to the output shaft and the electric motor; electric storage means for supplying electric power to the electric motor and for storing electric power generated in the electric motor and the generator, the electric storage means being electrically connected to both the electric motor and the generator; required minimal load judgment means for judging a required minimal load for driving the vehicle; and generator control means for controlling a rotational speed of the generator and a change rate of the rotational speed, in which the generator control means controls in response to the required minimal load judged by the required minimal load judgment means.

The generator control means increases the generator rotational speed as the required minimal load judged by the required minimal load judgment means is higher.

Incidentally, the required load detected by the required minimal load judgment detection means is at least one of the vehicle speed, the degree the accelerator opens, the output of the motor and the output of the electric storage means.

The hybrid vehicle of the present invention further includes residual capacity detection means for detecting the residual capacity of the electric storage means, so that the generator control means increases the rotational speed of the generator as the residual detected by the residual capacity detection means is lower.

Further, the generator control means controls the rotational speed change rate of the generator to be within a specified range. And, the generator control means extends the range of the permissible change rate of the rotational speed of the generator as the required load detected by the required minimal load judgment detection means is higher.

The hybrid vehicle of the present invention further includes mechanical stop means for mechanically stopping the rotation of the generator. The mechanical stop means can include wet-frictional materials. The mechanical stop means stops the rotation of the generator when the required minimal load judged by the required minimal load judgment means is less than a specified value. Further, the mechanical stop means stops the rotation of the generator when the rotation of the generator is rotated at less than the specified rotational speed.

A hybrid vehicle according to the present invention is further characterized by including an internal-combustion engine; an electric motor; a generator from which rotational speed is controlled; an output shaft connected for driving drive wheels; a differential gear unit composed of at least three elements in which a first element is connected to the engine, a second element is connected to the generator, and a third element is connected to the output shaft and the electric motor; engagement means connected to the generator; and generator control means for controlling the rotational speed of the generator and a change rate of the rotational speed, in which the generator control means controls the rotational speed of the generator and the rotational speed change rate to cause the relative rotational speed of the engagement means to be less than the specified value when the engagement means engages.

The aforementioned engagement means has mechanical stop means for mechanically stopping the rotation of the generator. The mechanical stop means includes wet-frictional materials. The mechanical stop means stops the rotation of the generator when the required minimal load judged by the required minimal load judgment means is less than a specified value. And, the mechanical stop means stops the rotation of the generator when the rotation of the generator is rotated at less than the specified rotational speed. That is, the mechanical top means engages when the difference of the rotational speed of the generator and the rotational speed of the output shaft is to be less than the specified rotational speed.

The engagement means has a clutch connecting between arbitrary two elements of the differential gear elements. And, the clutch engages when the rotation of the two elements connected by the clutch is to be less than the specified rotational speed.

BRIEF DESCRIPTION OF THE DRAWINGS

FIG. 1 is a conceptual diagram showing a drive train of a hybrid vehicle in a first embodiment according to the present invention;

DETAILED DESCRIPTION OF THE PREFERRED EMBODIMENT(S)

Figure 2A:
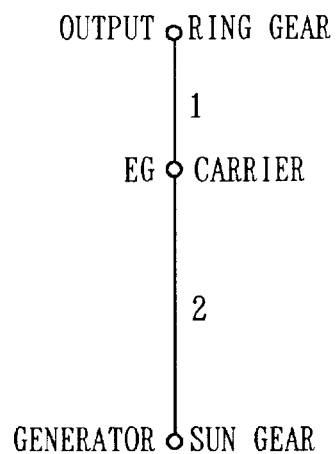
FIGS. 2 (A) and (B) are respectively a conceptual diagram and a velocity line diagram of a planetary gear unit in the first embodiment according to the present invention.

The first embodiment of a hybrid vehicle according to the present invention will be explained in detail below with reference to the attached drawings.

FIG. 1 is a conceptual diagram showing a drive train of the hybrid vehicle of the first embodiment according to the present invention. As shown in FIG. 1, the drive train of the hybrid vehicle has a four-shaft structure and includes an engine (EG) 11, a planetary gear unit 13, a generator (G) 16, an electric motor (M) 25 and a differential device 36. The "first shaft" is combined of the engine 11, an engine output shaft 12 outputting rotation producing by driving the engine 11, the planetary gear unit 13 being a differential gear unit carrying out shift for the rotation input through the engine output shaft 12, a unit output shaft 14 outputting the rotation shifted in the planetary gear unit 13, a first counter drive gear 15 fixedly connected to the unit output shaft 14, the generator 16 operating mainly as a generator in normal motion, and a transmitting shaft 17 connecting between the generator 16 and the planetary gear unit 13. The unit output shaft 14 is a sleeve-shape, and is arranged to encircle the engine output shaft 12. The first counter drive gear 15 is arranged to be in closer vicinity to the engine 11 than the planetary gear unit 13.

The planetary gear unit 13 includes a sun gear S as the second gear element, a pinion P meshed with the sun gear S, a ring gear R as the third gear element meshed with the pinion P, and a carrier CR as the first gear element rotatably supporting the pinion P.

The sun gear S is connected through the transmitting shaft 17 to the generator 16, the ring gear R is connected through the unit output shaft 14 to the first counter drive gear 15, and the carrier CR is connected through the engine output shaft 12 to the engine 11.

The planetary gear unit 13 functions as a differential gear unit, in which the rotational speed of the sun gear S determines the output rotational speed of the ring gear R in response to the input rotational speed of the carrier CR. That is, by controlling load torque of the generator 16, the rotational speed of the sun gear S can be controlled. For example, the sun gear S is freely rotated, the rotation of the carrier CR is absorbed to the sun gear S, but the ring gear R does not rotate, whereby no output rotation is produced.

In the planetary gear unit 13, the input torque of the carrier CR is a combined torque of reaction torque of the generator 16 and output shaft torque.

More specifically, the output from the engine 11 is input to the carrier CR, and the generator 16 is input to the sun gear S. The output torque of the engine 11 is output from the ring gear R through the counter gear to the drive wheels at a gear ratio based on engine efficiency. Furthermore, the output of the electric motor 25 is output through the counter gear to the drive wheels at sufficient gear ratio for motor efficiency.

The generator 16 is fixedly connected to the transmitting shaft 17 to include a rotatably provided rotor 21, a stator 22 arranged to encircle the rotor 21, and a coil 23 wound around the stator 22. The generator 16 generates electric power by using rotation transmitted through the transmitting shaft 17. The coil 23 is connected to a battery (not shown) to charge the battery by supplying electric power.

The generator 16 is connected to a brake B as an engagement element (mechanical stop means) at the other end of the transmitting shaft 17, in which, when the brake B is in the engaging state, the rotor 21 is locked, thereby the rotation of the generator 16 and the rotation of the sun gear S are stopped.

The "second shaft" being parallel to the "first shaft" is composed of the electric motor 25, a motor output shaft 26 outputting the rotation of the electric motor 25, and a second counter drive gear 27 fixedly connected to the motor output shaft 26.

The electric motor 25 is fixedly connected to the motor output shaft 26 to include a rotatably provided rotor 37, a stator 38 arranged to encircle the rotor 37, and a coil 39 wound around the stator 38. The electric motor 25 generates torque by using electric current supplied to the coil 39. Therefore, the coil 39 is structured to be connected to the battery (not shown) to be supplied with electric current from the battery.

In the decelerating state of the hybrid vehicle of the present invention, the electric motor 25 generates regenerative electric power by rotation received from drive wheels (not shown) to charge the battery by supplying regenerative electric power.

In order to rotate the drive wheels (not shown) in the same direction as the rotation of the engine 11, requires the "third shaft" being in parallel to the "first shaft" and the "second shaft", while the countershaft 31 is arranged as a driving output shaft. Further, the countershaft 31 is fixedly connected to a counter driven gear 32.

By meshing the counter driven gear 32 with the first counter drive gear 15 and meshing the counter driven gear 32 with the second counter drive gear 27, the rotation of the first counter drive gear 15 and the rotation of the second counter drive gear 27 are facilitated to be transmitted to the counter driven gear 32 in the reverse direction.

Further, to the countershaft 31, a dif-pinion gear 33 having a fewer number of teeth than the counter driven gear 32 is fixedly connected.

On the "fourth shaft" being parallel to the "first shaft", the "second shaft" and the "third shaft", a dif-ring gear 35 is arranged to be meshed with the dif-pinion gear 33. The dif-ring gear 35 is fixedly connected to the differential device 36, in which the rotation transmitted to the dif-ring gear 35 is transmitted to the drive wheels to be differentially rotated by the differential device 36. In the aforementioned structure, the driving output system is composed of the planetary gear unit 13, the generator 13, the first counter drive gear 15, the counter driven gear 32, the second counter drive gear 27, the countershaft 31, the dif-pinion gear 33, the dif-ring gear 35 and the differential device 36.

As described thus far, not only the rotation produced by the engine 11 but also the rotation produced by the electric motor 25 can be transmitted to the counter driven gear 32, thereby the hybrid vehicle can be driven in an engine driving mode in which the engine 11 is solely driven, a motor driving mode in which the electric motor 25 is solely driven, and an engine/motor driving mode in which both the engine 11 and the electric motor 25 are driven. By controlling electric power generated in the generator 16, the rotational speed of the transmitted shaft 17 can be controlled. When the rotation of the generator is stopped, the rotor 21 of the generator 16 is locked by engaging the brake B. In this case, by releasing the engagement of the brake B, a mode is defined as a running mode with generating electric power in the generator 16 in the released brake state, and as a running mode without generating electric power in the generator 16 in the engaged brake state.

The following is explained as to the operation of the planetary gear unit 13 of the hybrid vehicle as structured above. FIG. 2(A) is a conceptual diagram of the planetary gear unit 13 (FIG. 1) of the first embodiment according to the present invention, FIG. 2(B) is a velocity line diagram of the planetary gear unit 13 in normal motion in the first embodiment of the present invention, and FIG. 3 is a torque line diagram of the planetary gear unit 13 in normal motion in the first embodiment of the present invention.

In the present embodiment, as shown in FIG. 2(A), the number of teeth on the ring gear R is twice the number on the sun gear S in the planetary gear unit 13. In consequence, when the rotational speed of the unit output shaft 14 connected to the ring gear R ("ring gear rotational speed" as below) is defined as NR, the rotational speed of the engine output shaft 12 connected to the carrier CR ("engine speed" as below) is defined as NE, and the rotational speed of the transmitting shaft 17 connected to the sun gear S ("generator rotational speed" as below) is defined as NG, the relation among NR, NE and NG is, as shown in FIG. 2(B), $$NG = 3 \cdot NE - 2 \cdot NR$$

Figure 3:
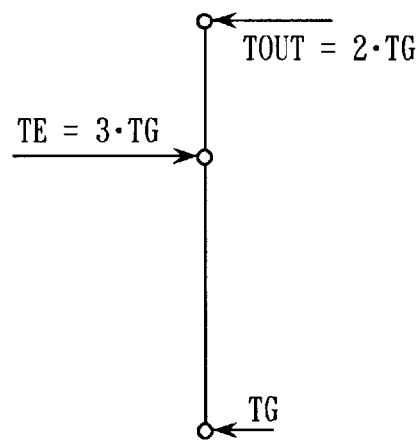
FIG. 3 is a torque line diagram of the planetary gear unit in the first embodiment according to the present invention.

Further, when torque output from the ring gear R to the unit output shaft 14 ("ring gear torque" as below) is defined as TR, torque of the engine 11 ("engine torque" as below) is defined as TE, and the generator torque is defined as TG, the relation among TR, TE, and TG is, as shown in FIG. 3, $$TE:TR:TG = 3:2:1$$

Figure 2B:
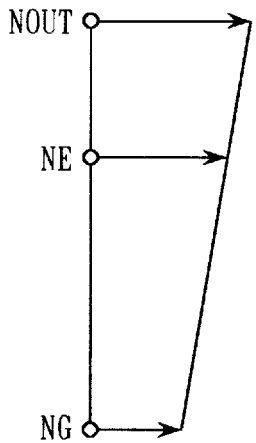

In normal motion of the hybrid vehicle, all of the ring gear R, the carrier CR and the sun gear S are rotated in the positive direction, therefore, as shown in FIG. 2(B), all of the ring gear rotational speed NR (=output rotational speed NOUT), the engine speed NE and the generator rotational speed NG take a positive value.

The engine torque TE is input to the carrier CR, and this engine torque TE is received by reaction of the generator 16 and the first counter drive gear 15 shown in FIG. 1. As a result, as shown in FIG. 3, the ring gear torque TR is output from the ring gear R to the unit output shaft 14, and the generator torque TG is output from the sun gear S to the transmitting shaft 17.

The aforementioned ring gear torque TR and generator torque TG can be obtained by dividing proportionally the engine torque TE at a torque ratio defined by the number of teeth of the planetary gear unit 13, that is, on the torque line diagram, the addition of the ring gear torque TR and the generator torque TG gives the engine torque TE.

Figure 4:
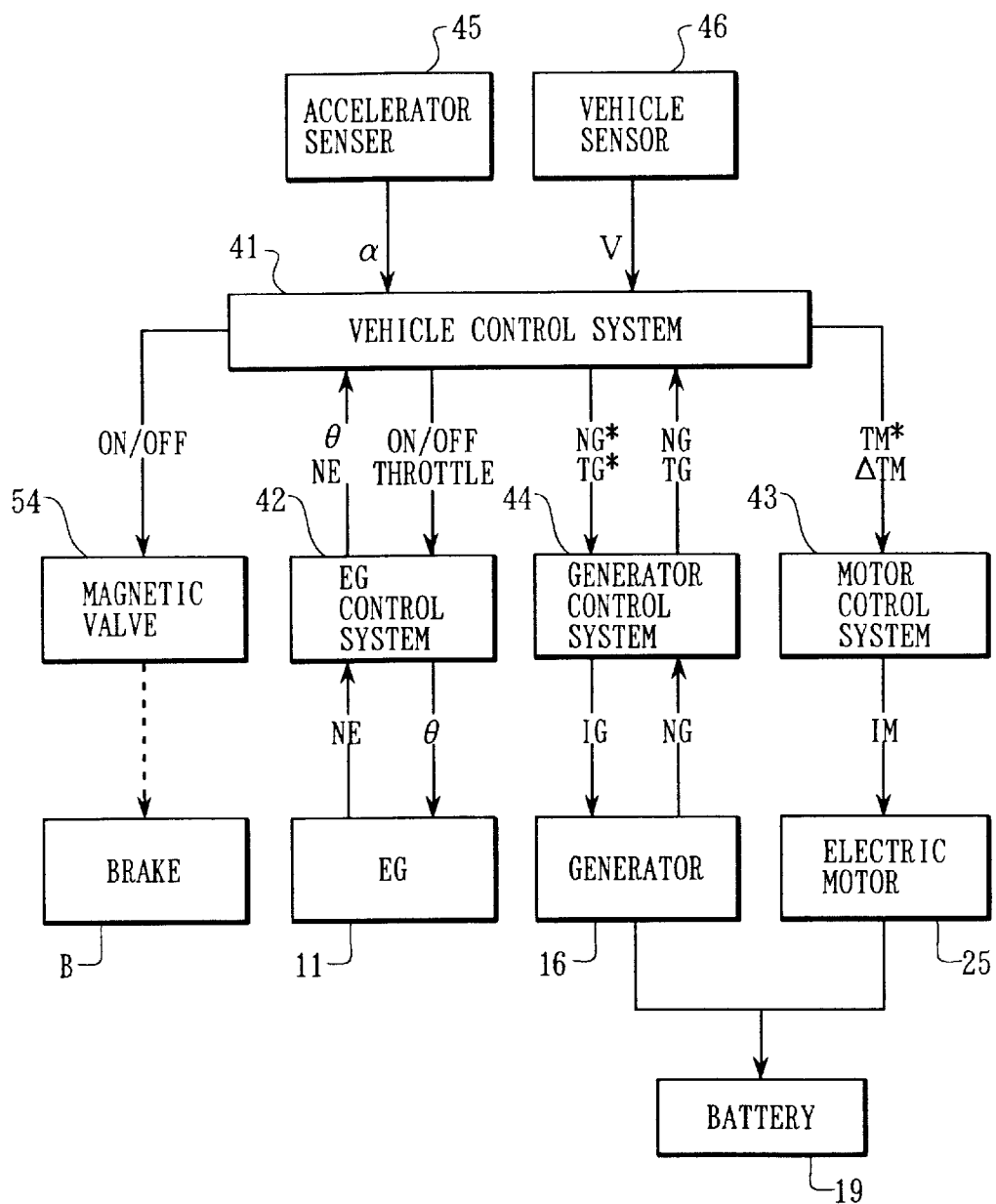
FIG. 4 is a block diagram showing a structure of a control system in the first embodiment according to the present invention.

Next, the control system of the hybrid vehicle according to the present invention will be explained in detail below with reference to a block diagram in FIG. 4. The control means structuring the control system of the embodiment has a vehicle control system 41, an engine control system 42, a motor control system 43, and a generator control system 44. These control systems 41, 42, 43 and 44 can be composed of a micro-computer including, for example, CPU (Central Processing Unit), ROM (Read Only Memory) various stored programs or data, and RAM (Random Access Memory) used as a working area.

The control system includes an accelerator sensor 45 for detecting the degree the accelerator is opened $\alpha$ which means the required level of the vehicle driver for the vehicle driving force, and a vehicle speed sensor 46 for detecting a vehicle speed V. Detected value in each sensor 45 and 46 is supplied to the vehicle control system 41.

The vehicle control system 41, which controls the whole of the hybrid vehicle, decides torque TM* in response to the degree the accelerator opens $\alpha$ supplied from the accelerator sensor 45 and the vehicle speed V supplied from the vehicle speed sensor 46, and further it supplies the decided torque TM* as a motor torque instruction value TM* to the motor control system 43. The motor control system 43 is supplied with a compensatory torque $\Delta$TM required in order to cause the electric motor 25 to absorb torque fluctuation produced by controlling the rotational speed of the generator 16.

Based on data table (not shown) corresponding to the degree of accelerator opening a and the vehicle speed, the degree the throttle opens and motor torque (reciprocal) are controlled. Here, the degree of accelerator opening $\alpha$ is a measure showing the will of the vehicle driver to increase/decrease driving force, and the degree the throttle opens is to control increase/decrease of torque of the internal-combustion engine.

The compensatory torque $\Delta$TM is calculated by the following. When the generator inertia is InG, and the rotational speed change rate (angular acceleration) of the generator 16 is $\beta$G, the sun gear torque TS acting to the sun gear S becomes TS=TG+ InG·$\beta$G. But, when the rotational speed change rate $\beta$G is extremely small, it becomes TS =TG. As described below, when the number of teeth on the ring gear R is twice the number on the sun gear S, the ring gear torque TR is twice the generator torque TG, therefore, the fluctuating torque (the compensatory torque) $\Delta$TM, which should be absorbed by the electric motor 25, becomes $\Delta$TM= 2·i·TS=2·i·(TG+InG·$\beta$G) when the counter gear ratio is i.

The vehicle control system 41 supplies an engine ON/OFF signal to the engine control system 42. More specifically, for example, the engine ON/OFF signal is supplied in accordance with the ON/OFF of an ignition key.

Figure 5:
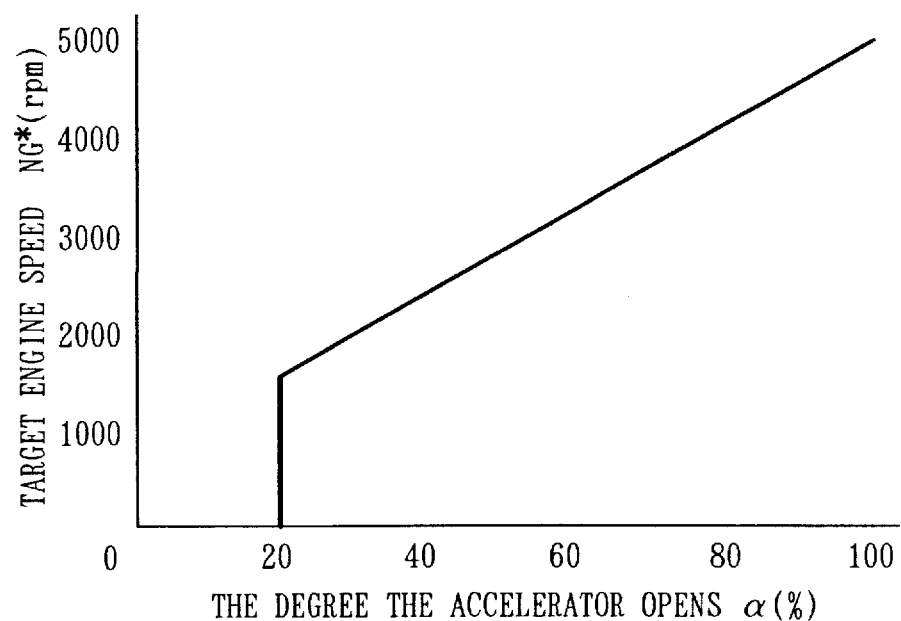
FIG. 5 is an explanatory view showing the relationship of the target rotational speed NG* and the degree the accelerator opens a of the hybrid vehicle the first embodiment according to the present invention.

The vehicle control system 41 supplies a control target rotational speed of the generator 16 to the generator control system 44. The target rotational speed NG*, as shown in FIG. 5, is defined as the function NG*=f ($\alpha$) of the degree the accelerator opens a supplied from the accelerator sensor 45. That is, in the case of the degree the accelerator opens $\alpha$>20%, the target rotational speed NG* is defined to be larger in proportion to the degree the accelerator opens a, but in the case of the degree the accelerator opens $\alpha\leq$20%, it is to be NG*=0.

Further, the vehicle control system 41 supplies the ON/OFF signal to a magnetic valve 54 for operating the brake B. In the magnetic valve 54, a solenoid included in the magnetic valve 54 is operated based on the supplied ON/OFF signal, for example, in the ON signal, the solenoid is operated to open the valve and to supply compressed oil from an oil pump to the brake actuator, thereby the brake B is operated in the engaging state, but in the OFF signal, the valve is closed, thereby the engagement of the brake B is released.

In order to control shock caused by engaging the brake B, the vehicle control system 41 acts in the following way. The torque fluctuation produced by engaging the brake B is needed to be reduced to control shock caused by engaging the brake B, and the fluctuating torque of the generator 16 in the engagement of the brake can be obtained by using $\Delta$TG=InG·$\beta$G as described above. More specifically, by reducing the rotational speed change rate by $\beta$G, shock caused by engaging the brake, and further exhaustion of the frictional material can be reduced. Before the vehicle control system 41 supplies the ON signal to the magnetic valve 54, the vehicle control system 41 controls the generator rotational speed NG to be the rotational speed (zero) in the engagement of the brake, and then engages the brake B. At this time, a permissible rotational speed value $\Delta$NG* is defined as the predetermined range capable of causing the brake B to engage without carrying the shock to the driver and increasing the exhaustion of the frictional material of the brake B, therefore, the brake B is engaged when an absolute value of the actual rotational speed |NG| is smaller than the permissible rotational speed value $\Delta$NG*. As a result, the rotational speed change rate $\beta$G, when the rotation speed is changed from before engaging the brake B to after engaging, is small, thereby shock in engaging the brake is reduced.

The engine control system 42 causes the engine based on a selectable instruction signal inputted from the vehicle control system 41 to switch to be in the driving condition (an ON condition) in which the engine torque is output, and to be in the non-driving condition (an OFF condition) in which the engine torque is not produced. Further, the engine control system 42 controls the output of the engine 11 by controlling the degree the throttle opens $\theta$ in response to the actual engine speed NE inputted from the engine speed sensor provided in the engine 11. The actual engine speed NE and the degree the throttle opens $\theta$ are inputted into the vehicle control system 41. Incidentally, the degree the throttle opens $\theta$ can be replaced with the degree the accelerator opens $\alpha$.

The motor control system 43 controls electric current (torque) IM of the electric motor 25 to be TM=TM*–$\Delta$TM when the compensatory torque $\Delta$TM is supplied from the vehicle control system 41, and to be TM =TM* when the compensatory torque $\Delta$TM is not supplied. In consequence, the output torque can be maintained to be the specified torque TM* at all times without receiving influence of the control for the rotational speed of the generator 16. That is, the torque compensation means is structured by the vehicle control system 41 and the motor control system 43.

The generator control system 44 controls the rotational speed NG of the generator 16 and controls the electric current (torque) IM to be the control target rotational speed NG* or the control target torque TG* input from the vehicle control system 41. The generator control system 44 monitors the output torque TG of the generator 16 and the actual rotational speed NG of the generator 16 and inputs the monitored values to the vehicle control system 41. The generator control means is structured by the vehicle control system 41 and the generator control system 44.

Action of the hybrid vehicle of the embodiment as structured above will be explained below. In the embodiment, the degree the accelerator opens α is used as a required minimal load. When the degree the accelerator opens α is lower than the specified value, the brake B is engaged to lock the rotational speed of the generator. Therefore, electric current is not required to flow to the generator 16, resulting in prevention against a waste of electricity in the generator 16.

On the other hand, power consumption of the electric motor 25 is greater as the required minimal load is higher (the degree the accelerator opens α is large). Therefore, when the degree the accelerator opens α is higher than the specified value, the brake B is released to increase electrical generating capacity by accelerating the rotational speed of the generator 16 in proportion to the degree the accelerator opens α. Electric power generated in the generator 16 in response to the required minimal load is adapted to be directly consumed in the electric motor 25. As a result, reduction of the efficiency which is caused by charging and discharging the battery 19 is prevented. That is, when the degree the accelerator opens α is lower than 20%, the brake B is engaged to lock the generator 16, but when it is higher than 20%, the brake B is released to cause the generator 16 to generate.

Figure 6:
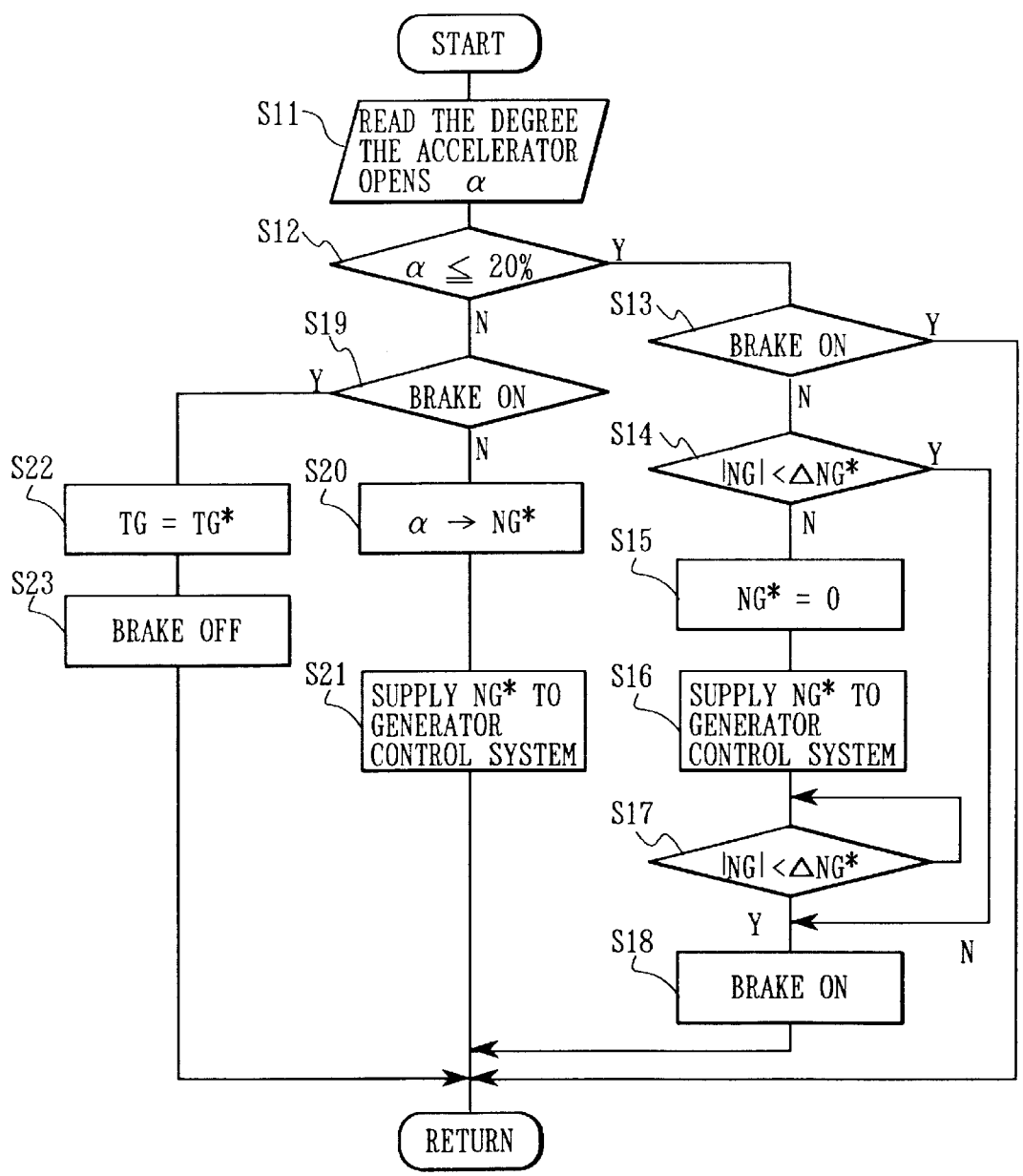
FIG. 6 is a flow chart showing a control action of a vehicle control system in the first embodiment according, to the present invention.

The following explains as to a control action of the hybrid vehicle in detail. FIG. 6 is a flow chart showing the control action of the hybrid vehicle. The vehicle control system 41 reads the degree for accelerator opening α from the accelerator sensor 45 (Step s11), judges whether the degree the accelerator opens α is lower than 20% or not (Step s12). When the degree the accelerator opens a is lower than 20%, the vehicle control system 41 judges whether the brake B is in the engaging state (ON state) or not (Step s13). When the brake B is in the engaged state (Step s13: Yes), the intact state is retained, and the acting train returns to the main-routine.

When the brake B is in the releasing state (OFF state), namely, when the degree the accelerator opens α is lower than 20% and the brake B is in the releasing state (Step s13: No), the vehicle control system 41 judges whether the rotation of the generator should be locked or not. That is, the vehicle control system 41 judges whether the absolute value |NG| of the generator rotational speed NG is lower than the permissible value ΔNG* or not (Step s14).

When it is |NG|<ΔNG* (Step s14:Yes), the vehicle control system 41 supplies the ON signal to the magnetic valve 54 to engage the brake B (Step s18), and returns to the main-routine. By engaging the brake B, the generator 16 is locked, resulting in control of the waste of electric power in the generator 16.

When it is |NG|≧ΔNG* (Step s14: No), the vehicle control system 41 controls to be NG*=0 based on FIG. 5 (Step s15), and supply this NG*=0 to the generator control system 44 (Step s16). Here, the vehicle control system 41 monitors the actual generator rotational speed NG through the generator control system 44 and, in the same way as Step 14, judges whether the absolute value |NG| of the generator rotational speed NG is lower than the permissible value ΔNG* or not (Step s17). Step 17 is repeated until |NG|<ΔNG* (Step s17: No), and when |NG|<ΔNG* is achieved by the control of the generator control system 44 (Step s17: Yes), the vehicle control system 41 causes the brake B to engage by supplying the ON signal to the magnetic valve 54 (Step s18), and the acting train returns to the main-routine.

In the controlling action in which the generator control system 44 controls the actual rotational speed NG to approach the target rotational speed NG* after the target rotational speed NG* is supplied in Step s16, the actual rotational speed NG is controlled to remain within the range in which the change rate of the actual rotational speed NG does not exceed a maximum change rate ΔNGMAX (rpm/sec)as the predetermined range. Since the generator 16 and the engine 11 are mutually connected through the planetary gear unit 13, when the rotational speed NG of the generator 16 is rapidly controlled, for example, the engine 11 is spouted, resulting in the fear of an adverse effect on the amount of exhausted gases or fuel consumption. Therefore, the aforementioned maximum change rate ΔNGMAX is defined as the change rate having limitation not to adversely affect as described above.

Figure 7:
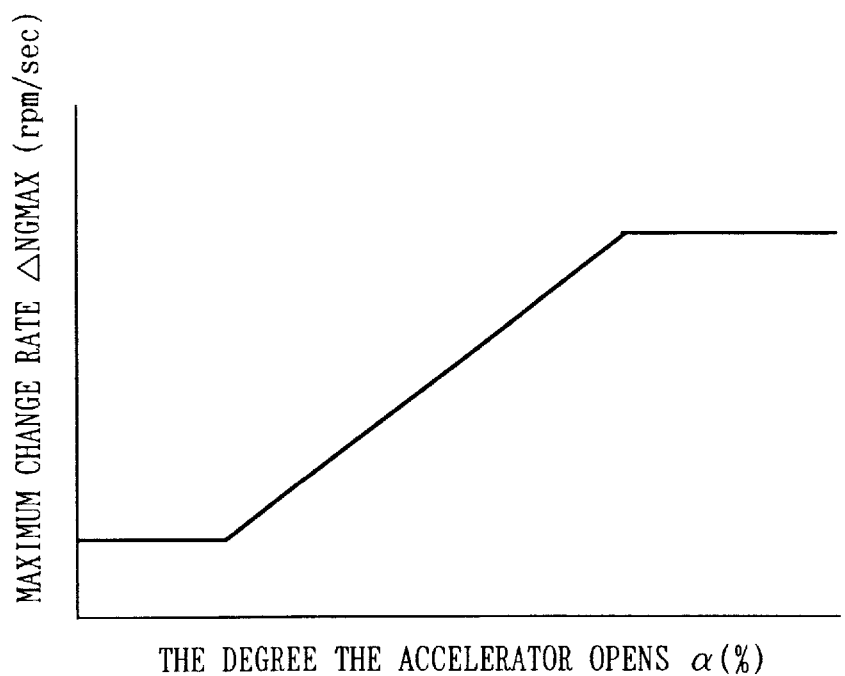
FIG. 7 is an explanatory view showing the relationship of the degree the accelerator opens $\alpha$ and a maximum change rate $\Delta$NGMAX of the generator rotational speed in the first embodiment according to the present invention.

FIG. 7 shows the maximum change rate ΔNGMAX. As shown in the drawing, the maximum change rate ΔNGMAX is defined to be larger as the value of the degree the accelerator opens α is larger. Incidentally, the maximum change rate ΔNGMAX is not defined as a function of the degree the accelerator opens α, but may be defined as a fixed value.

When the degree the accelerator opens a input in Step s11 is higher than 20% in Step s12, the brake B is judged as to whether being in the engaging state (ON state) or not (Step s19). When the brake B is in the releasing state (OFF state) (Step s19: No), the vehicle control system 41 decides the target rotational speed NG* of the generator 16 by using the degree the accelerator opens α based on FIG. 5 (Step s20), and supplies the target rotational speed NG* to the generator control system 44 (Step s21), and the action train returns to the main-routine. But, when the brake B is in the engaging state (ON state) (Step s19: Yes), the vehicle control system 41, in order to maintain the rotational speed of the generator 16, maintains the torque TG of the generator 16 to be at a set value TG* defined by the engine torque TE (Step s22). And further, the vehicle control system 41 supplies the OFF signal to the magnetic valve 54 to release the engagement of the brake B to be in the releasing state (OFF state) (Step s23).

Incidentally, TG=TG* in Step s22 is for preventing from increasing the exhausted gases by rapidly increasing the speed of the engine 11. That is, when the degree the accelerator opens a is larger than 20% and, at this time, the brake B is in the engaging state (Step s19: Yes), it is a state desired that the brake B would be in the releasing state (a hybrid running) and the rotational speed NG of the generator 16 would be the generator rotational speed NG* in response to the degree the accelerator opens α. However, when the brake B rapidly changes into the releasing state regardless of the rotational speed NG of the generator 16, the engine speed of the engine 11 is rapidly increased, resulting in a fear of exhausting the exhausted gases. In consequence, in order to maintain the rotational speed of the generator 16, the rotational speed is previously increased to be the generator torque TG* defined by the engine torque at this time. And further, by changing the state of the brake B to be in the releasing state, the generator 16 being element for reaction the engine 11 is operated to control the rapid increase of the engine 11, resulting in prevention from exhausting the exhausted gases.

Figure 8:
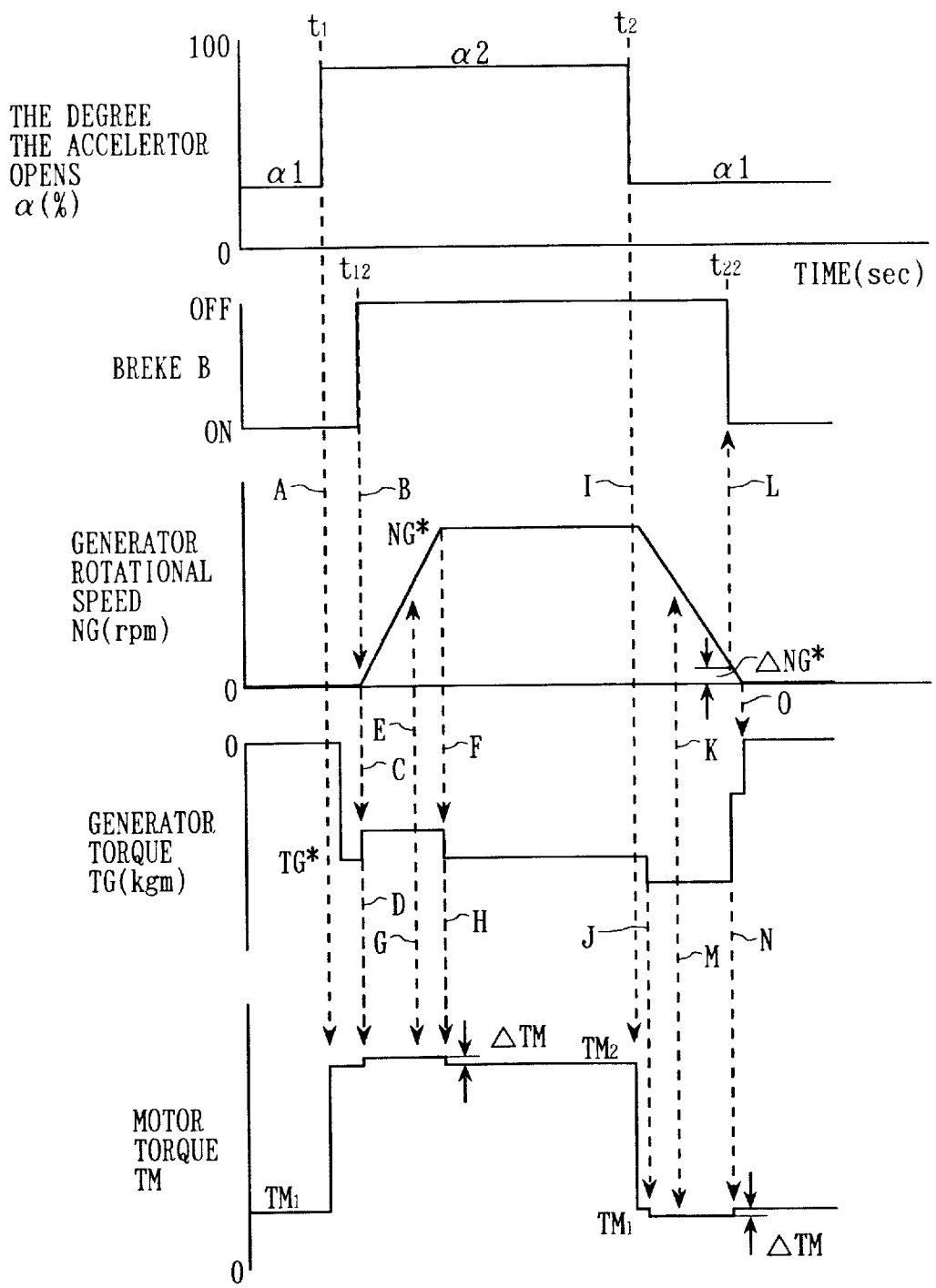
FIG. 8 is a time chart showing the control action of the vehicle control system in the first embodiment according to the present invention.

Action of the drive train of the hybrid vehicle according to the present invention will be explained in detail below with reference to a time chart shown in FIG. 8. The action, when, as shown in FIG. 8, at time t1, the accelerator pedal is depressed, and the degree the accelerator opens changes from α to α2, and further, at time t2, the degree the accelerator opens changes from α2 to al, will be explained. Here, α1<20% and α2>20% are defined.

In the state of α1 for the degree the accelerator opens, the brake B is engaged (ON state), the generator 16 is locked, therefore, the rotational speed and the generator torque TG are in the zero state. Further, the motor torque TM is motor torque TM1 in response to the degree the accelerator opens α1.

In time t1, when the degree the accelerator opens changes from α1 to α2, the motor torque TM increases from TM1 to TM2 in order to output the output torque in response to the degree the accelerator opens α2. At this time, the brake B is in the ON state (it is illustrated with a dotted line A in FIG. 8. The following is the same.).

In order to prevent a step increase of the engine speed of the engine 11 by releasing the brake B, the generator torque is previously increased to the generator torque TG* defined by the engine torque TE at this time. After TG=TG*, in time t12, the brake B is released (OFF), and simultaneously, the generator rotational speed NG of the generator is increased to less than the specified rotational speed change rate (dotted line B). In the embodiment, while the target rotational speed NG* of the generator 16 is instructed, the compensatory torque ΔTM is added by calculating the generator torque TG at all times (dotted line C). Therefore, as shown in FIG. 8, the motor torque TM is added with the compensatory torque ΔTM in accordance with the change of the generator torque TG (dotted line D).

This generator rotational speed NG is not rapidly increased (dotted line E), and reaches the target rotational speed NG*. During this period, the generator rotational speed NG is not rapidly changed, thereby no adverse effect, such as increase of exhausted gases and exacerbated fuel consumption caused by a steep increase of the engine speed, is produced in the engine 11.

At the same time as the generator rotational speed reaches the target rotational speed NG*, the generator 16 is controlled to remain the target rotational speed NG*. The increase of the generator rotational speed NG stops, so that the absolute value of the generator torque TG is larger than when the rotational speed had been increasing (dotted line F). During this period, the motor torque TM is added with the compensatory torque ATM (dotted line G), and when the generator rotational speed NG reaches the target rotational speed NG*, the absolute value of the generator torque TG is larger, therefore, in order to amend for the generator torque, the motor torque TM is smaller dotted line H).

When the degree the accelerator opens is changed from α2 to α1, in order to output the output torque in accordance with the degree the accelerator opens α, the motor torque TM is decreased from TM2 to TM1. At this time, the brake B is in the OFF state (dotted line I). In order that the generator rotational speed NG is to be zero which is a value of the rotational speed in the brake engaging state (ON), the generator torque TG is increased, and simultaneously, for the motor torque TM, the compensatory torque ΔTM is amended to respond to the change of the generator torque TG (dotted line J). The generator rotational speed NG is decreased so as not to rapidly change (dotted line K), and when it is smaller than ΔNG*, at time22, the brake B is engaged (ON) (dotted line L). During the period, the generator rotational speed NG is not rapidly changed, thereby no adverse effect, such as an increase of exhausted gases and exacerbated fuel consumption caused by a steep increase of the engine speed, is produced in the engine 11.

While the generator rotational speed is making a descent, the motor torque TM takes place while the torque compensation (dotted line M), that is, the running condition which the driver feels is maintained, and further, the brake B is engaged and since the generator torque TG becomes smaller, the motor torque TM is larger for the decrease of the generator torque TG (dotted line N). When the generator 16 is completely locked by the brake B, the generator torque TG is to be zero (dotted line 0).

In the action in the drive train as described thus far, the engine, the generator and the output shaft are connected through the planetary gear unit to one another, therefore, the relationship among the engine speed NG, the generator rotational speed NG, and the output shaft rotational speed NOUT is the following equation (1) as a and b are constants;

$$NE = a \cdot NG + b \cdot NOUT \qquad (1)$$

Here, when the brake B is changed to ON to lock the rotation of the generator 16, it is to be NG=0, consequently, NE is proportional to NOUT, resulting in NE=b·NOUT.

But, when the brake B is changed to OFF to release the rotation of the generator 16, the degree the engine speed NE is increased is proportional to the generator rotational speed NG.

Incidentally, the aforementioned explanation refers to the control action for engaging/releasing the brake B, as the borderline, in a state when the degree the accelerator opens α is 20%, however, the present invention is not intended to be limited to the aforementioned action, that is, the present invention can be applied in the case of changing running modes between a running mode while the generator 16 is generating and a running mode while the generator 16 does not generate in a manual operation, and further, the case of locking the rotor 21 of the generator 16 in motion, for example, when the rotor 21 of the generator 16 is locked in order to operate an engine-brake.

The brake B used in the embodiment described above can use various kinds of brake. In this case, a wet-brake and a dry-brake can be used, but, from the view of easy control of the rotational speed, it is desirable to use the wet-brake using a wet-friction material.

Figure 9:
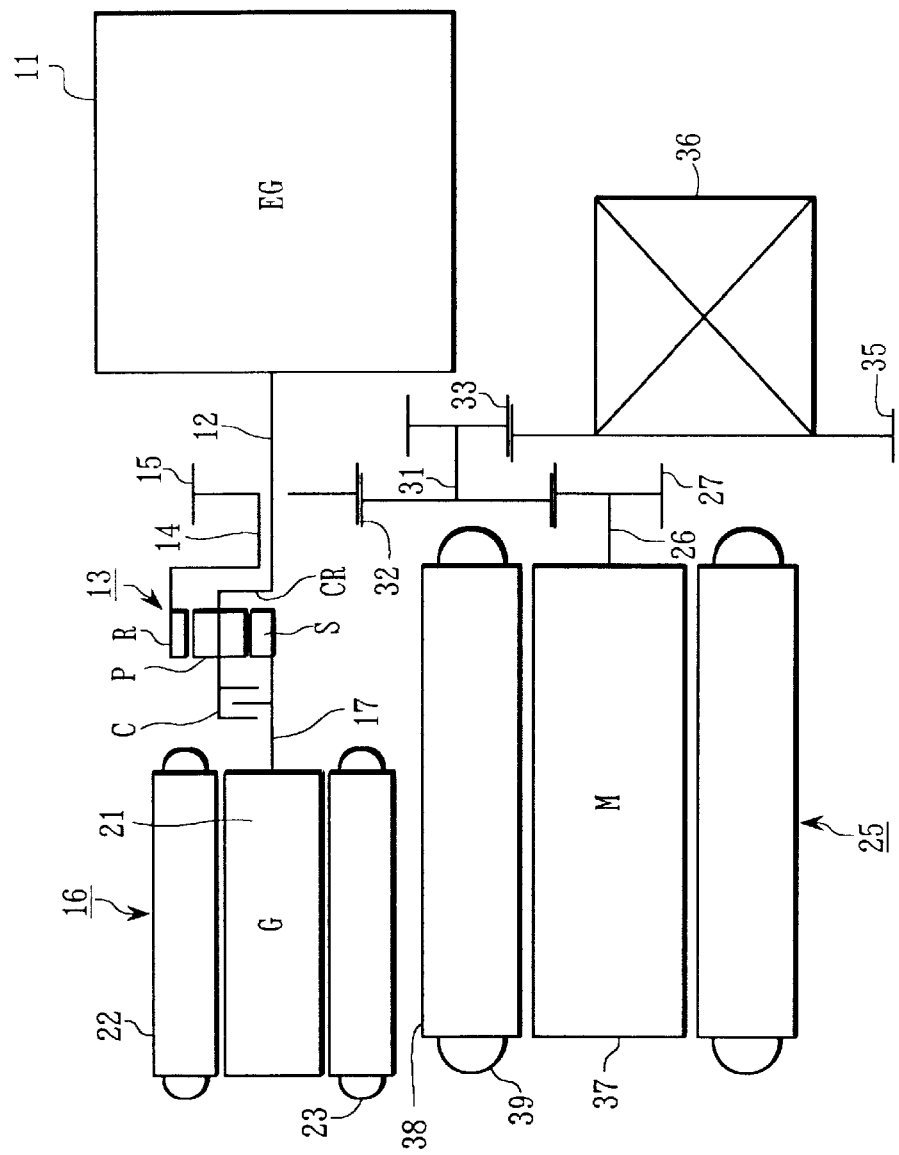
FIG. 9 is a conceptual diagram showing the drive train of the hybrid vehicle in a second embodiment according to the present invention.

A second embodiment according to the present invention will be explained below. FIG. 9 is a conceptual diagram showing a structure of the drive train of the second embodiment. In the hybrid vehicle according to the embodiment, the planetary gear unit 13 is provided with a clutch C between the carrier CR and the sun gear S, and the brake B, arranged to the generator 16 in the first embodiment, is not provided. The clutch C is controlled to engage and release by an actuator to which the ON/OFF signal is supplied from the vehicle control system 41. Since the other structure is the same as the first embodiment, the same reference numerals will be used to designate the same or similar components as those in FIG. 1, so that the description will be omitted.

Action of the drive train of the second embodiment will be described. The clutch C is in the releasing state (OFF state) in normal motion, and is in the engaging state (ON state) when accelerating.

In the normal motion in which the clutch C is released, the planetary gear unit 13 is opened, that is, as shown in FIG. 2(B), the sun gear S, the carrier CR and the ring gear R are independently rotated at different rotational speeds from one another. In the second embodiment, since the number of teeth on the ring gear R is twice the number on the sun gear S, the gear ratio of the engine 11 for the unit output shaft 14 is ⅔.

In accelerating in which the clutch C is engaged, each gear element in the planetary gear unit 13 is associatively rotated with one another, with the result that the rotational speed of each gear element is to be the same. At this time, the gear ratio of the engine 11 for the unit output shaft 14 is 1, as compared with the releasing state of the clutch C, the output, transmitted from the engine 11 to the unit output shaft 14, is increased to 1.5 times. In consequence, the output, transmitted to the countershaft 31 as the driving output shaft, is increased, resulting in acceleration.

Figure 10:
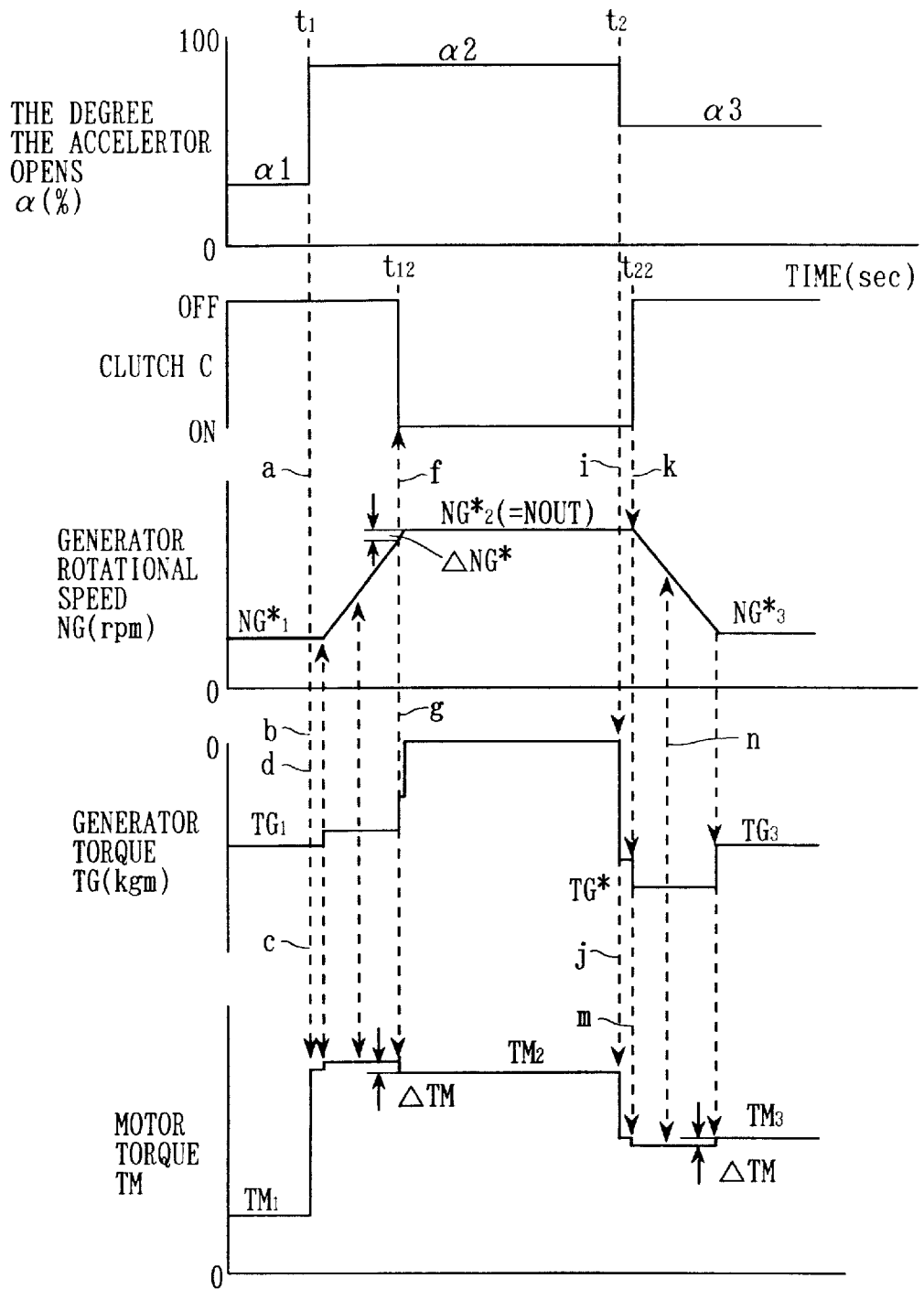
FIG. 10 is a time chart showing the control action of the vehicle control system in the second embodiment according to the present invention.

The control action for the second embodiment will be explained. FIG. 10 is a time chart showing the control action. The following explains this by taking an example, in which the vehicle is accelerated by increasing the degree the accelerator opens from α1 to α2, and, after accelerating, the degree the accelerator opens is changed to α3.

In normal motion, the degree the accelerator opens is α, and the clutch C is in the releasing state (OFF state), further, the rotational speed NG and the torque TG of the generator 16, and the motor torque TM are respectively defined as values in response to the degree the accelerator opens α1 and the vehicle speed V.

At time t1, increasing the degree the accelerator opens from α1 to α2 for accelerating, in order to output the output torque in response to the degree the accelerator opens α2, the motor torque TM is increased from TM1 to TM2. At this time, the clutch C is in the OFF state (a dotted line a shows in FIG. 10. The following is the same.).

In order that the generator rotational speed NG is to be the output rotational speed NOUT input to the ring gear R, the generator 16 is defined with NOUT for the target rotational speed NG*2 to decrease the generator torque TG. Consequently, the generator rotational speed NG starts increasing toward the target rotational speed NG*2 (a dotted line b). Simultaneously, for the motor torque TM, the compensatory torque ΔTM is amended in response to the change of the generator torque TG (a dotted line c). The generator rotational speed NG is increased with no steep change (a dotted line d), and when the difference between the actual rotational speed NG and the target rotational speed NG*2 is smaller than ΔNG*, at time t12, the clutch C is engaged (ON) (a dotted line g). Here, ΔNG* is a value defined within the range, in which consumption of the frictional material of the clutch C is not developed and shock is not transmitted to the driver, and is a permissible value of the difference between the actual rotational speed NG and the target rotational speed NG*2 when the clutch C is engaged.

At time t2, when the acceleratory running is finished and the degree the accelerator opens is decreased from α2 to α3 to be in normal motion, the motor torque TM is decreased in response to the degree the accelerator opens α (a dotted line j). In order to control the engine 11 not to make a steep increase of the engine speed which is caused by releasing the clutch C in the state of no additional torque for the generator 16, the generator torque TG*, defined by the engine torque TE at this time, is found, and prior to this, the generator torque is increased until reaching TG* (a dotted line i).

After TG=TG*, at time t22, the clutch C is released (OFF), simultaneously, the generator rotational speed NG starts decreasing toward the target rotational speed NG*3 not to exceed the maximum of the rotational speed change rate (a dotted line k). The motor torque TM is added with the compensatory torque ΔTM in response to the change of the generator torque TG (a dotted line m). The generator rotational speed NG is not rapidly decreased (a dotted line n), and reach the target rotational speed NG*3.

The clutch C, used in the embodiment described thus far, may be one of a wet-clutch and a dry-clutch, but in point of reduction of shock produced in engaging the clutch, it is desirable to use the wet-clutch. By using the wet-clutch, shock produced when the clutch C is engaged can be further controlled.

Further, the clutch C can be provided between the sun gear S as the second gear element and the ring gear R as the third gear element or between the carrier CR and the ring gear R. In this case, the method for controlling the generator rotational speed NG is the same as the case of the aforementioned second embodiment.

A third embodiment according to the present invention will be described below.

In the first embodiment, the generator rotational speed NG is changed to be the target rotational speed NG* in response to the degree the accelerator opens α, but, in the third embodiment, the maximum is defined for the change rate ΔNG of the generator rotational speed NG.

That is, the generator control system 44 calculates the change rate ΔNG while inputting the value of the generator rotational speed NG in order, and causes the rotational speed to increase by degrees until the target rotational speed NG* not to exceed the maximum change rate ΔNGMAX.

Figure 11:
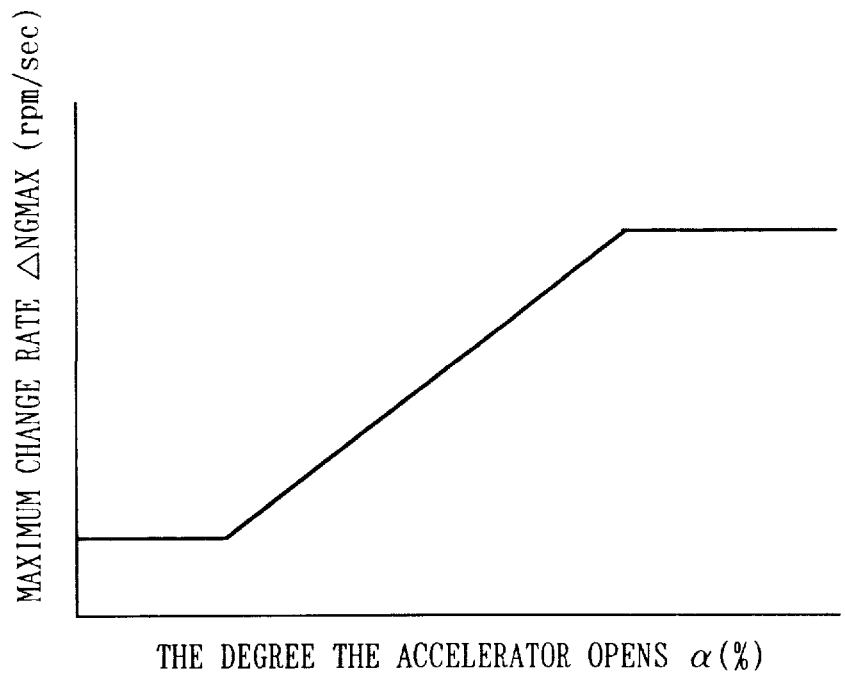
FIG. 11, is an explanatory view showing the relationship of the degree the accelerator opens $\alpha$ and the maximum change rate $\Delta$NGMAX of the generator in a third embodiment according to the present invention.

FIG. 11 shows the maximum change rate ΔNGMAX of the generator 16. As shown in FIG. 11, the maximum change rate ΔNGMAX is defined to be larger as the value of the degree the accelerator opens α is larger. Incidentally, the maximum change rate ΔNGMAX is not a found as function of the degree the accelerator opens α and can be a constant value.

According to the third embodiment, the change rate ΔNG of the rotational speed of the generator 16 is controlled to be less than the maximum value, whereby the increase of the amount of exhausted gases by the engine 11 can be prevented.

A fourth embodiment according to the present invention will be described below.

In the first embodiment, when the target rotational speed NG* of the generator is decided, it is found from FIG. 5 as function NG*=f(α) of only the degree the accelerator opens α, but in the fourth embodiment, the target rotational speed NG* is found as a function of the degree the accelerator opens α and the charge residual capacity SOC of the battery 19.

Figure 12:
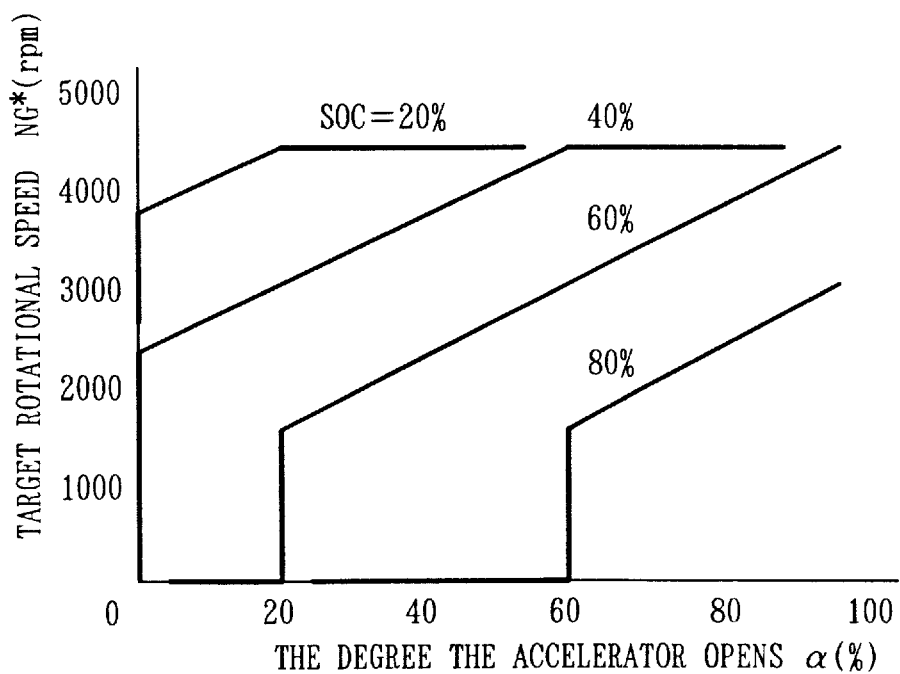
FIG. 12 is an explanatory view showing the relationship among the target rotational speed NG* of the generator, the degree the accelerator opens $\alpha$ and the charge residual capacity SOC in a fourth embodiment according to the present invention.

FIG. 12 shows the relationship among the target rotational speed NG*, the degree the accelerator opens α and the charge residual capacity SOC. As shown in the drawing, the target rotational speed NG* is defined to be smaller as the degree the accelerator opens α is smaller, but to be larger as the charge residual capacity SOC is smaller.

The degree the accelerator opens α for switching the brake B ON/OFF is changed to response to the charge residual capacity SOC of the battery 19. More specifically, in Step s12 of FIG. 6, in the case of SOC=80% and the degree the accelerator opens α≦60%, Step s12 moves to Step s13. Further, in the case of SOC=60% and the degree of accelerator opening α≦20%, and in the case of SOC= 40%, 20% and the degree the accelerator opens α≦0%, Step s12 moves to Step s13.

The following is an explanation as to a fifth embodiment.

In the first embodiment, the value of the degree the accelerator opens α is used as the required minimal load, but in this fifth embodiment, the motor output is used as the required minimal load.

Figure 13:
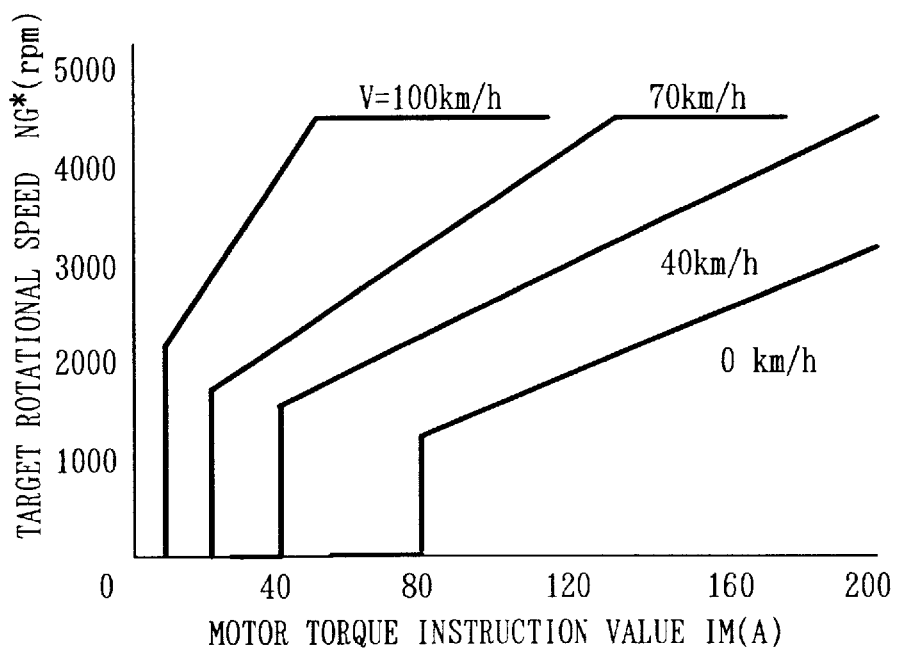
FIG. 13 is an explanatory view showing the relationship among the target rotational speed NG* of the generator, the motor torque instruction value IM and the vehicle speed V in a fifth embodiment according to the present invention.

FIG. 13 shows the relationship among the target rotational speed NG*, the motor torque instruction value IM (electric current value) and the vehicle speed V.

The motor output is proportional to the motor torque and rotational speed (the vehicle speed). As shown in FIG. 13, as the motor torque instruction value IM and the vehicle speed V are greater, the target rotational speed NG* of the generator is defined to be greater. The vehicle control system 41 finds the target rotational speed NG* along a map of FIG. 13 from the motor torque instruction value IM, supplied from the motor control system 43 to the electric motor 25, and the vehicle speed V from the vehicle speed sensor 46, and it supplies the value found to the generator control system 44.

In the fifth embodiment, the brake B is judged whether to be ON or OFF by using the value of the motor torque IM, but the value IM is changed by the vehicle speed V like the forth embodiment. That is, in Step s12 of FIG. 6, when the vehicle speed is V=0 km/h, if the motor torque instruction value is IM≦80A, Step s12 moves to Step s13. Similarly, in the cases of the vehicle speed V=40 km/h and IM≦40A, the vehicle speed V=70 km/h and IM≦20A, and the vehicle speed V=100 km/h and IM≦8A, the action train moves to Step s13.

The following explains as to a sixth embodiment.

The sixth embodiment as well as the fifth embodiment uses the motor output as the required minimal load, but in the embodiment, a required electric power PM of the electric motor 25 is calculated and the target rotational speed NG* is found as a function of the calculated electric power PM.

Figure 14:
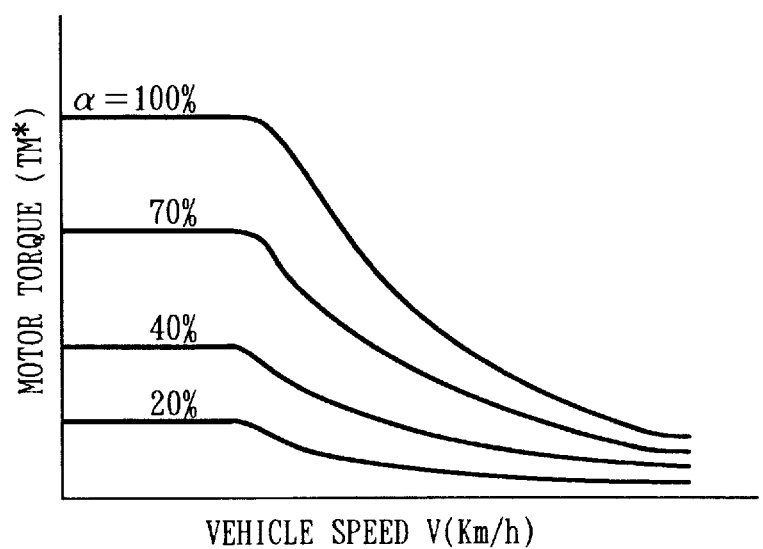
FIG. 14 is an explanatory view showing the relationship of the motor torque TM and the degree the accelerator opens $\alpha$ in a sixth embodiment according to the present invention.

The vehicle control system 41 inputs the degree the accelerator opens α and the vehicle speed V from the accelerator sensor 45 and the vehicle speed sensor 46. Further, the motor output torque TM is found as function TM =f (α, V) of the degree the accelerator opens α and the vehicle speed V from FIG. 14.

A motor rotational speed NM is read from a motor rotational speed sensor (not shown), and the required electric power PM of the electric motor 25 is calculated from an equation PM=TM×NM.

Figure 15:
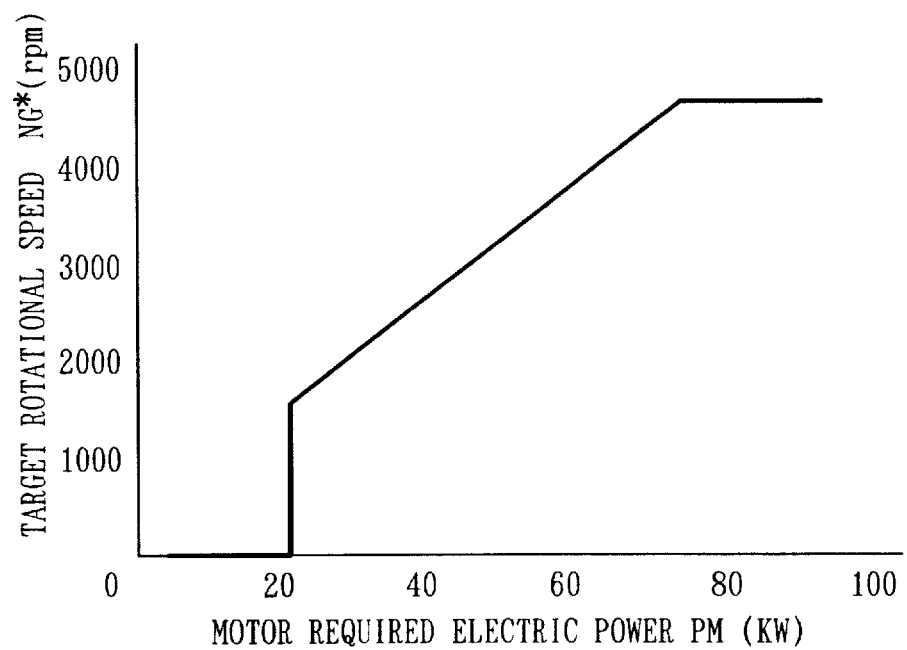
FIG. 15 is an explanatory view showing the relationship of the target rotational speed NG* of the generator and the required electric power PM of the electric motor in a seventh embodiment according to the present invention.

The vehicle control system 41 calculates the target rotational speed NG* from the required electric power PM calculated based on FIG. 15.

In this embodiment, the brake B is judged whether to be ON or OFF by using the value of the motor required electric power PM.

Incidentally, in the fifth and sixth embodiments as described above, the motor output other than the degree the accelerator opens α is used as the required minimal load, but, otherwise, the output of the battery 19 can be used.

The following explains as to a seventh embodiment.

Figure 16:
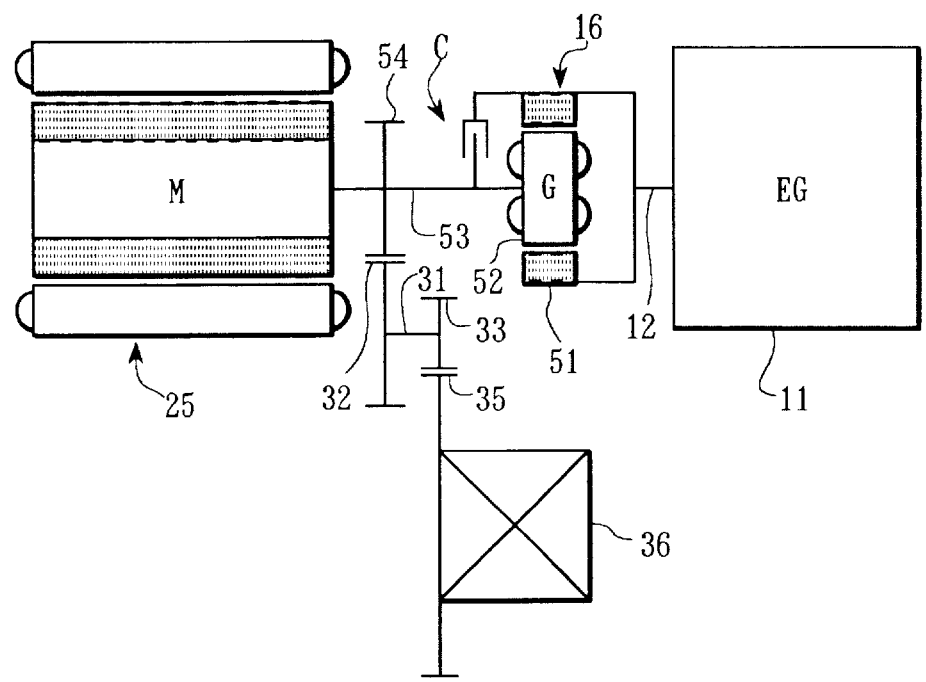
FIG. 16 is a conceptual diagram showing the arrangement of the drive train of the hybrid vehicle in the seventh embodiment according to the present invention.

FIG. 16 is a conceptual diagram showing the arrangement of the drive train of the hybrid vehicle in the third embodiment. Incidentally, the same reference numerals will be used to designate the same or similar components as those in the first embodiment shown in FIG. 1, so that the description will be omitted or simplified.

As shown in FIG. 16, in the third embodiment, an output shaft 12 of the engine 11 is connected to a stator 51 (not held in a case) of the generator 16, and a rotor 52 of the generator 16 is connected to an output shaft 53. The motor 25 is connected to the output shaft 53. The output shaft 53 is connected to a counter drive gear 54, and the counter drive gear 54 is meshed with the counter driven gear 32 of the countershaft 31.

The generator 16 is provided with the clutch C functioning as a mechanical stop means, as an equivalent to the brake B in the first embodiment shown in FIG. 1. The clutch C is connected to the stator 51 and the rotor 52.

In the structure of the seventh embodiment, the control, explained in the first embodiment to the sixth embodiment, can be applied. Incidentally, in the case of the seventh embodiment, in equation (1) showing the relationship among the engine speed NE, the generator rotational speed NG and the output shaft rotational speed NOUT, the constant b is to be b=1.

The present invention is not intended to be limited to the embodiments described thus far, and various changes can be made therein without departing from the spirit of the present invention. For example, in the first embodiment, the structure, in which the engine and the generator are connected through the planetary gear unit to the output shaft, is explained, however, in the present invention, the engine and the generator can be connected through a differential gear, such as a bevel gear or the like, to the output shaft.

According to the aforementioned embodiments, electric power generated in the generator 16 is directly used in the electric motor 25, resulting in improved electric efficiency by way of the battery 19.

The amount of electricity used by way of the battery 19 can be reduced, resulting in the improved life of the battery 19.

The engine speed of the engine 11 is increased during high-load, the engine sound is accorded with the speed sensed, therefore, the running condition which the driver feels is to be a natural feeling.

When the engine operates the oil pump (O/P), at the higher load, the rotational speed of O/P is further increased, resulting in an increase of lubricant or cooling oil.

Further, in the embodiments, the case, in which the battery 19 is used as an electric source device for supplying and applying electric power between the electric motor 25, has been explained, however, in the present invention, the other electric source device, such as a capacitor, a flywheel-battery, a hydraulic (pneumatic) accumulator and so on, can be used as the electric source device.

As the capacitor, for example, an electrical double layer condenser, in which the capacity per unit volume is larger and the output density is larger with low-resistance, and the like can be used. When the capacitor is used as the electric source device, the voltage value of the capacitor is used as a residual electric power capacity (S.O.C.).

The flywheel-battery is a battery supplying and receiving electric power by driving and regenerating a flywheel by using a motor arranged on the same shaft as the flywheel. When the flywheel-battery is used as the electric source device, the rotational speed of the flywheel is used as the residual electric power capacity (S.O.C.).

The hydraulic (pneumatic) accumulator is a battery supplying and receiving electric power by loading and unloading the hydraulic (pneumatic) pressure to and from the accumulator by using a hydraulic (pneumatic) pump connected to the accumulator. When the hydraulic (pneumatic) accumulator is used as the electric source device, the hydraulic (pneumatic) pressure is used as the residual electric power capacity (S.O.C.).

In the present innovation mentioned thus far, in the period before and after the engagement element (mechanical stop means) is engaged, the difference of the rotational speed of the generator is to be small, with the result that shock, produced when the engagement element (mechanical stop means) is engaged, is controlled. In consequence, endurance of the engagement element (mechanical stop means) is improved, especially, heat load received onto the frictional material is reduced, resulting in greatly improved endurance of the frictional material. The device, such as the accumulator cushioning the impact when the engagement element is engaged and the like, is not required, resulting in achievement of simplification and weight reduction of the driving system and unnecessariness of tuning for a shock absorber and the like. Furthermore, for receiving fewer adverse effects, caused by the time-varying of the frictional material, the driving condition, the change of temperature and so on, the stable effect of controlling shock can be obtained.

Shock, caused by locking the rotor of the generator when the vehicle is changed from the generation running to the non-generation running, can be controlled.

Shock produced by engaging the clutch at the time of the change from the normal running to the accelerating running.

The torque fluctuation, produced when the generator rotational speed is controlled, is absorbed by amending the motor torque, resulting in maintenance of feeling for satisfactory speed.

Furthermore, by controlling the change rate of the generator rotational speed to remain within the specified range, the rapid changing of the generator rotational speed is controlled, resulting in a reduction of adverse effects on the amount of exhausted gases and the fuel consumption of the engine.

What is claimed is:

1. A hybrid vehicle, comprising:
   an internal-combustion engine;
   an electric motor;
   a generator from which rotational speed is controlled;
   an output shaft connected for driving drive wheels;
   a differential gear unit composed of at least three elements in which a first element is connected to said engine, a second element is connected to said generator, and a third element is connected to said output shaft and said electric motor;
   electric storage means for supplying electric power to said electric motor and for storing electric power generated in said electric motor and said generator, said electric storage means being electrically connected to both said electric motor and said generator;
   required minimal load judgment means for judging a required minimal load for driving the vehicle; and
   generator control means for controlling a rotational speed of said generator and a change rate of the rotational speed, said generator control means controlling in response to the required minimal load judged by said required minimal load judgment means.

2. The hybrid vehicle according to claim 1, wherein said generator control means increases the generator rotational speed as the required minimal load judged by said required minimal load judgment means is higher.

3. The hybrid vehicle according to claim 1, wherein the required load detected by said required minimal load judgment detection means is at least one of the vehicle speed, the degree the accelerator opens, the output of said motor and the output of said electric storage means.

4. The hybrid vehicle according to claim 1, further comprising residual capacity detection means for detecting the residual capacity of said electric storage means, so that said generator control means increases the rotational speed of said generator as the residual detected by said residual capacity detection means is lower.

5. The hybrid vehicle according to claim 1, wherein said generator control means controls the rotational speed change rate of said generator to be within a specified range.

6. The hybrid vehicle according to claim 5, wherein said generator control means extends the range of the permissible change rate of the rotational speed of said generator as the required load detected by said required minimal load judgment detection means is higher.

7. The hybrid vehicle according to claim 1, further comprising mechanical stop means for mechanically stopping the rotation of said generator.

8. The hybrid vehicle according to claim 7, wherein said mechanical stop means includes wet-frictional materials.

9. The hybrid vehicle according to claim 7, wherein said mechanical stop means stops the rotation of said generator when the required minimal load judged by said required minimal load judgment means is less than a specified value.

10. The hybrid vehicle according to claim 7, wherein said mechanical stop means stops the rotation of said generator when the rotation of said generator is rotated at less than a specified rotational speed.

11. A hybrid vehicle, comprising:
    an internal-combustion engine;
    an electric motor;
    a generator from which rotational speed is controlled;
    an output shaft connected for driving drive wheels;
    a differential gear unit composed of at least three elements in which a first element is connected to said engine, a second element is connected to said generator, and a third element is connected to said output shaft and said electric motor;
    engagement means connected to said generator; and
    generator control means for controlling a rotational speed of said generator and a change rate of the rotational speed, said generator control means controlling the rotational speed of said generator and the rotational speed change rate to cause the relative rotational speed of said engagement means to be less than the specified value when said engagement means engages.

12. The hybrid vehicle according to claim 11, wherein said engagement means has mechanical stop means for mechanically stopping the rotation of said generator.

13. The hybrid vehicle according to claim 12, wherein said mechanical stop means includes wet-frictional materials.

14. The hybrid vehicle according to claim 12, wherein said mechanical stop means stops the rotation of said generator when the required minimal load judged by said required minimal load judgment means is less than a specified value.

15. The hybrid vehicle according to claim 12, wherein said mechanical stop means stops the rotation of said generator when the rotation of said generator is rotated at less than a specified rotational speed.

16. The hybrid vehicle according to claim 12, wherein said mechanical stop means engages when the difference of the rotational speed of said generator and the rotational speed of said output shaft is to be less than a specified rotational speed.

17. The hybrid vehicle according to claim 12, wherein said engagement means has a clutch connecting between two arbitrary elements of said differential gear elements.

18. The hybrid vehicle according to claim 12, wherein said clutch engages when the rotation of the two elements connected by said clutch is to be less than a specified rotational speed.

* * * * *

UNITED STATES PATENT AND TRADEMARK OFFICE
CERTIFICATE OF CORRECTION

PATENT NO. : 5,823,281
DATED : October 20, 1998
INVENTOR(S) : YAMAGUCHI et al

It is certified that error appears in the above-indentified patent and that said Letters Patent is hereby corrected as shown below:

Col. 1, line 22, "iy" should read --by--.
Col. 3, line 24, "top" should read --stop--;
       line 49, after "open" insert --$\alpha$--; and delete "a".
       line 52, delete "according," insert --according.
Col. 4, line 1, delete "11," insert --11--.
Col. 7, line 35, delete "a" insert --$\alpha$--;
       line 62, delete "a" insert --$\alpha$--; and
       line 65, delete "a" insert --$\alpha$--.
Col. 10, line 21, delete "a" insert --$\alpha$--;
        line 42, delete "a" insert --$\alpha$--; and
        line 65, delete "$\alpha$" and insert --$\alpha$1--.
Col. 11, line 45, delete "dotted" insert --(dotted--; and
        line 48, delete "$\alpha$" insert --$\alpha$1--.
Col. 13, line 11, delete "$\alpha$" insert --$\alpha$1--.

Signed and Sealed this

Ninth Day of November, 1999

Attest:

Q. TODD DICKINSON

*Attesting Officer*          *Acting Commissioner of Patents and Trademarks*